Figure 4:
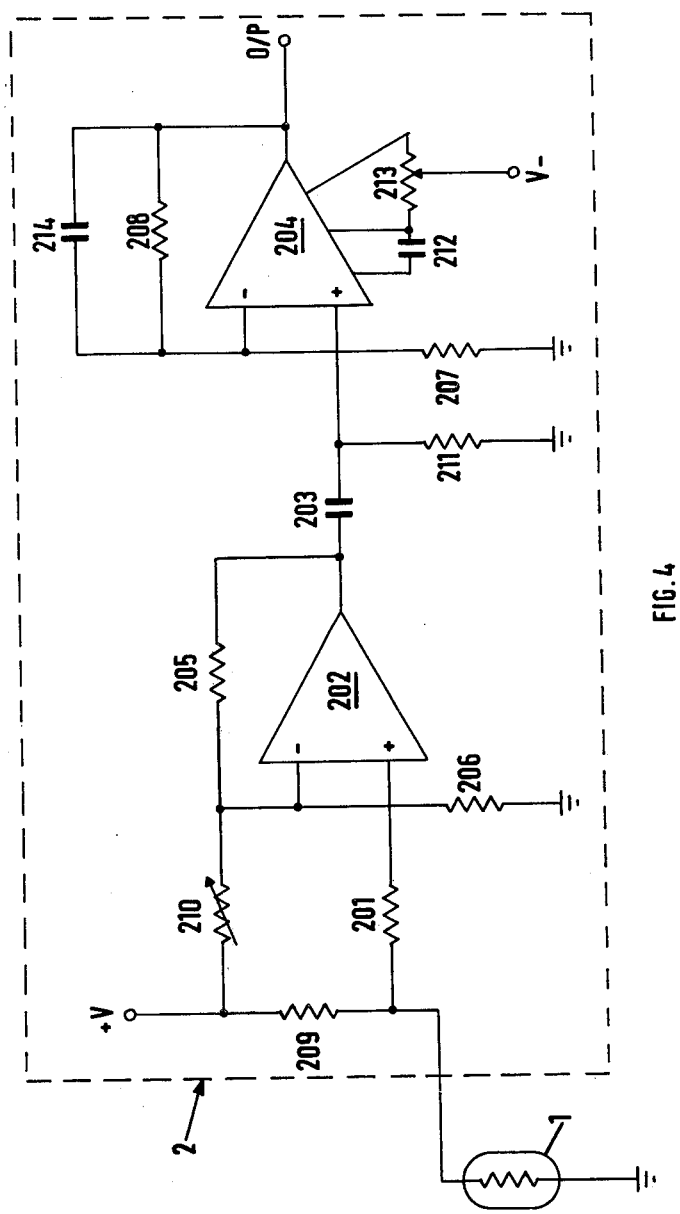
Figure 5:
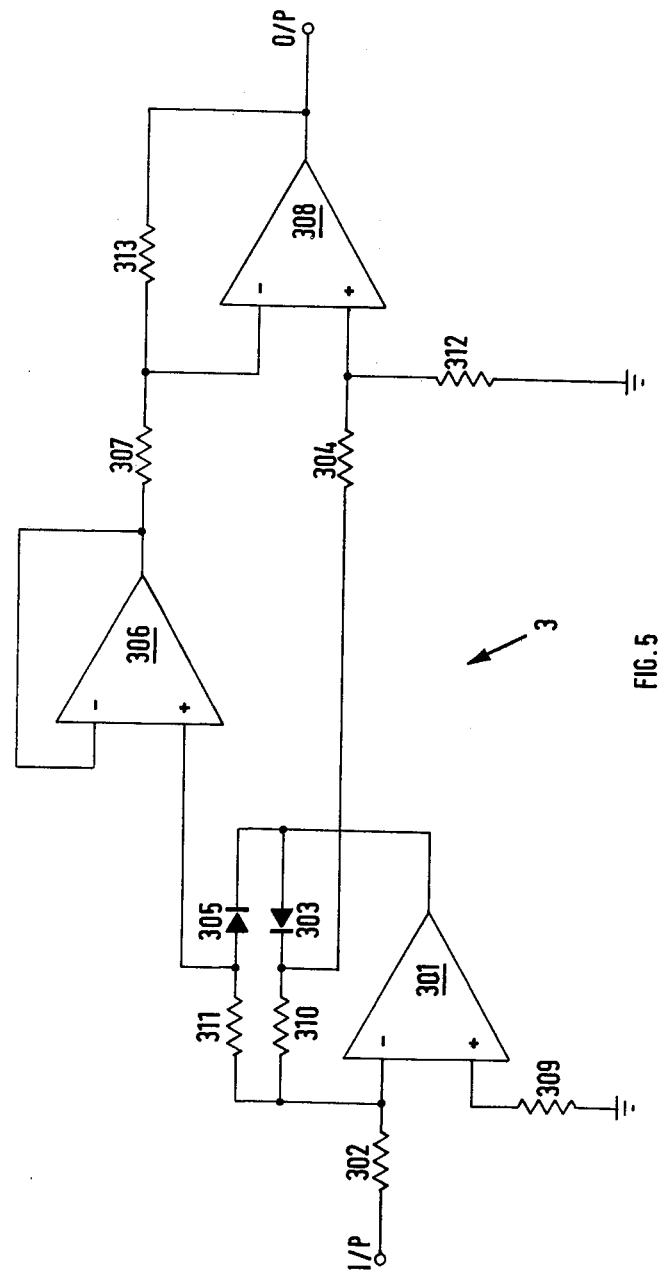
Figure 6:
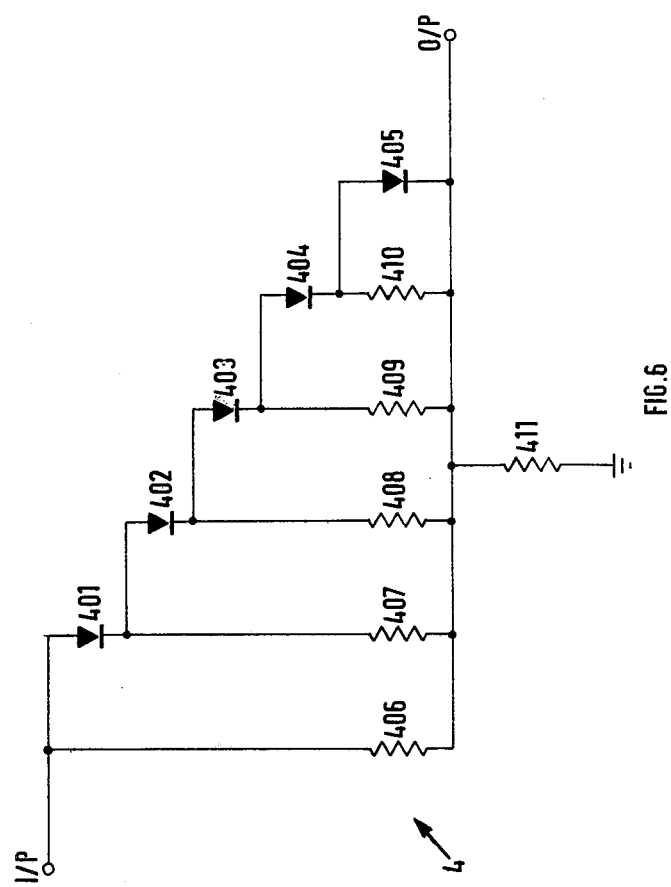
Figure 7:
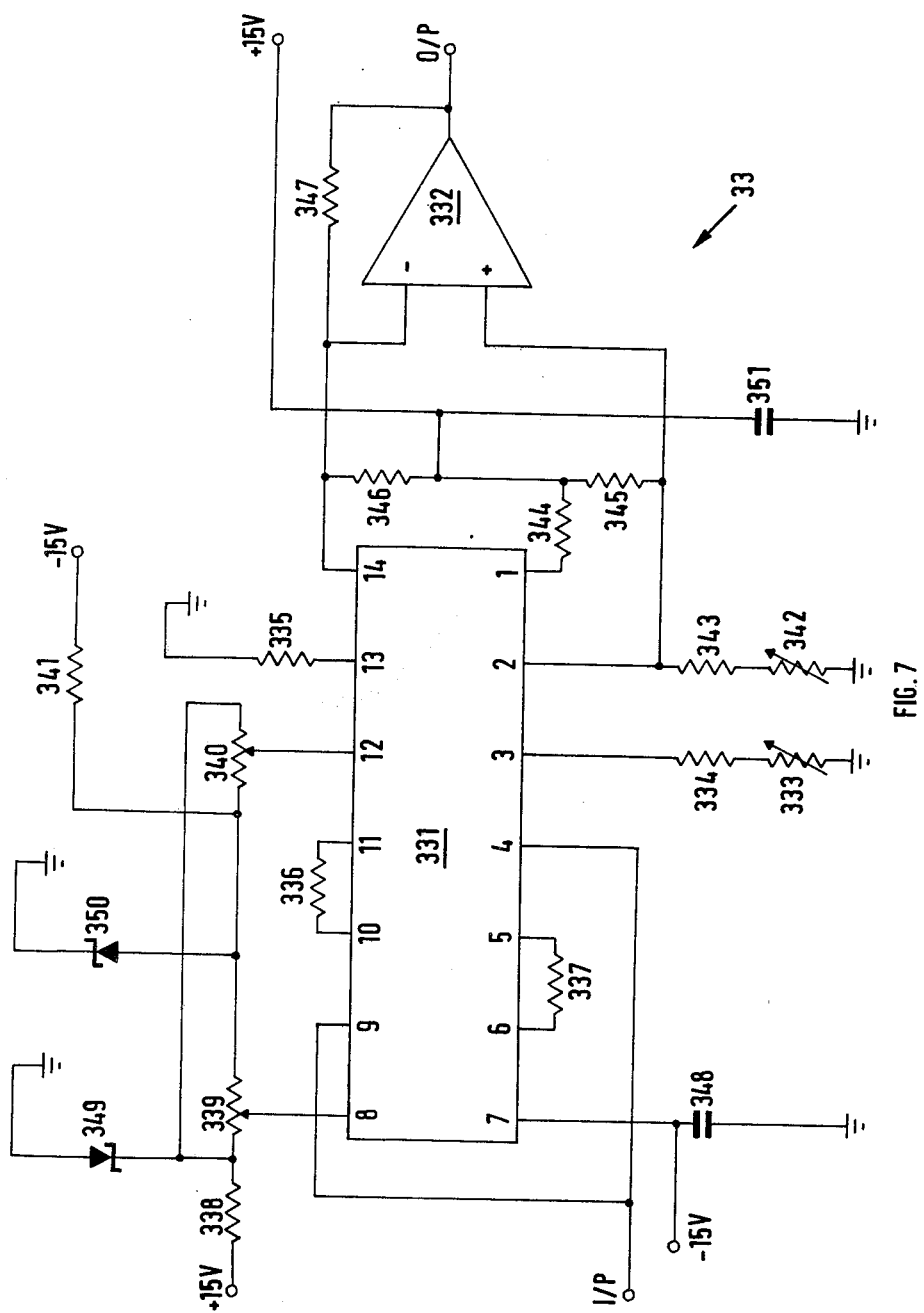

United States Patent [19]

Annetts

[11] 4,322,725
[45] Mar. 30, 1982

[54] TEMPERATURE MEASUREMENT SYSTEM

[75] Inventor: Michael J. Annetts, Edinburgh, Scotland

[73] Assignee: Coal Industry (Patents) Limited, London, England

[21] Appl. No.: 163,860

[22] Filed: Jun. 27, 1980

Related U.S. Application Data

[63] Continuation of Ser. No. 926,169, Jul. 19, 1978, abandoned.

[30] Foreign Application Priority Data

Jul. 27, 1977 [GB] United Kingdom ............... 31526/77

[51] Int. Cl.³ .................... G01K 7/30; G08B 17/06
[52] U.S. Cl. .................... 340/595; 73/359 R; 73/DIG. 7; 340/589; 340/632
[58] Field of Search ............. 340/595, 588, 589, 632; 73/204, 359 R, DIG. 7

[56] References Cited

U.S. PATENT DOCUMENTS

| | | | |
|---|---|---|---|
| 2,827,624 | 3/1958 | Klein | 340/588 |
| 2,884,786 | 5/1959 | Burk et al. | 73/359 |
| 3,818,761 | 6/1974 | Brixy et al. | 73/359 |
| 3,878,723 | 4/1975 | Blalock et al. | 73/359 |
| 3,890,841 | 6/1975 | Brixy | 73/359 |
| 3,937,086 | 2/1976 | von Thuna | 73/359 |
| 4,099,413 | 7/1978 | Ohte et al. | 73/359 |

Primary Examiner—John W. Caldwell, Sr.
Assistant Examiner—Joseph E. Nowicki
Attorney, Agent, or Firm—James C. Wray

[57] ABSTRACT

The invention provides a fire detection system which comprises an electric thermal transducer such as a thermistor placed in a turbulent gas stream. The transducer produces a signal, having an AC and a DC component, which signal is preferably amplified. The components are separated out in a discriminator, for instance an AC amplifier and the AC component is squared and integrated to give a final output which is proportional to the temperature of a heat source, such as a fire, upstream of the transducer. The invention also provides a fire detection system comprising a series of transducers connected to a single processing apparatus, the signal from the transducers being compared to locate a heat source. The invention also provides a method of detecting a fire using a system as described above.

11 Claims, 8 Drawing Figures

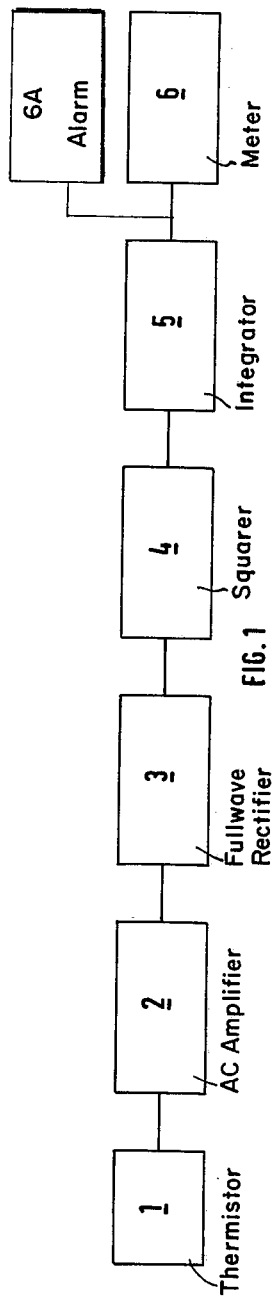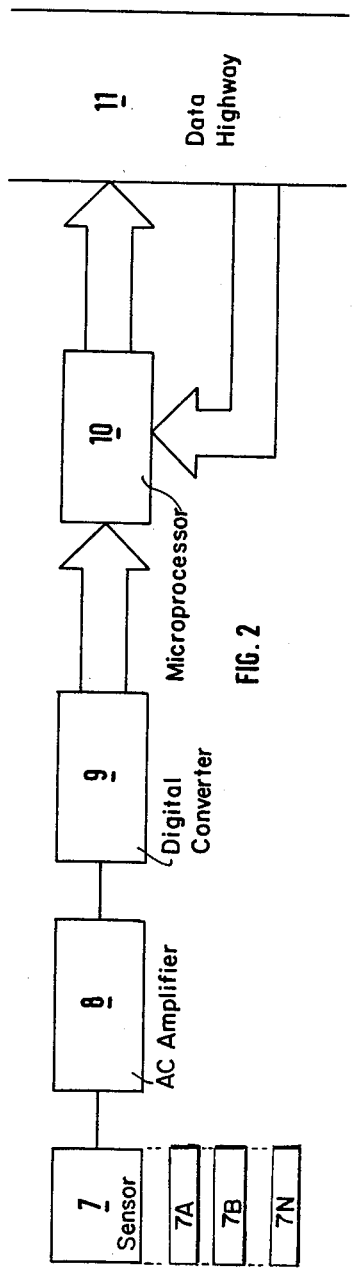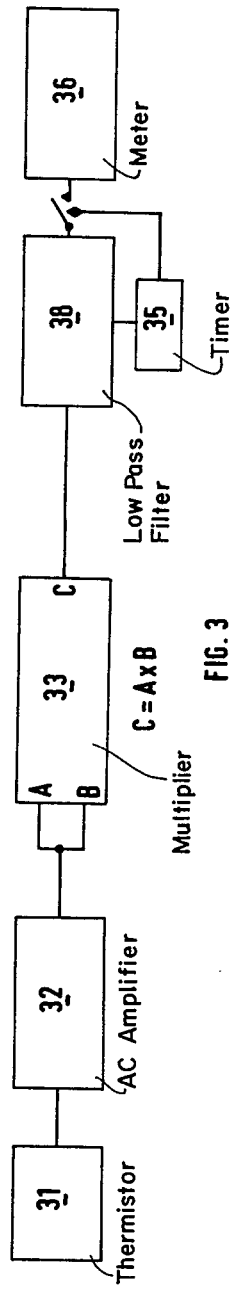

TEMPERATURE MEASUREMENT SYSTEM

This application is a continuation of application Ser. No. 926,169, filed July 19, 1978, now abandoned.

This invention relates to a temperature measurement system which can be used to detect fires in ventilated ducts and tunnels, especially roadways and faces in underground coal mining operations.

A turbulent gas stream has a particular dynamic temperature state for a given set of conditions. This appears as a small random variation about the ambient temperature level.

A heat source, such as an open fire or frictionally heated machinery, will impart energy to a gas stream flowing past the source. The added energy causes a change in the dynamic temperature state i.e. there is a change in the amplitude of the random temperature variations.

The present invention makes use of the small random temperature variations and has as its object to provide a fire detection system.

According to the present invention a fire detection system comprises an electric thermal transducer arranged to be placed in a turbulent gas stream and to produce a signal having an AC and a DC component (as hereinafter defined), a discriminator which separates the AC component from the DC component, and a processing unit, to which the AC component from the discriminator is fed and which is programmed to produce an output proportional to a time average of the square of the AC component, the output being related to the temperature of a remote heat source upstream of the transducer. Preferably the AC component is amplified before being fed to the processing unit.

The theory behind the operation of this system is as follows. The transducer when located in the turbulent stream will produce a varying signal. At any given time the signal, which is usually measured as a voltage $V_o$, (although the invention is not limited to measuring voltages) can be split up into two components, which are the AC and DC components mentioned above. The DC component is defined as that component of the signal which is due to the ambient temperature of the gas stream. This may be called $V_T$. The AC component is defined as that component of the signal which is due to variations about the mean ambient temperature. This may be defined as k (a constant) $x \Delta T$ (which is the variation in the temperature of the gas stream away from ambient). The signal from the transducer $V_o = K \Delta T + V_T$.

The DC component is called such because it varies very little over a long period and so appears to be essentially DC. The AC component is called such because it varies with a frequency of between 1 and a few hundred Hz. (This is effectively the 'noise' component of the signal).

The discriminator operates to give $V_o - V_T$, (which=$k\Delta T$) which is the signal related to the dynamic temperature state of the gas and may be called $V_i$. Now $V_i$ is a function of time i.e. $V_i = f(t)$, and the energy component of a function with respect to time is proportional to the square of the amplitude of the function.

i.e. $E(t) \alpha (f(t))^2 \alpha V_i^2$ $\therefore E(t) = k_1 V_i^2$

Thus a measurement of the square of the AC voltage output from the thermal transducer gives a measure of the energy related to the dynamic temperature state of the gas stream (i.e. the 'noise' power). This provides a measurement which will show an increase with added energy from a heat source or fire upstream of the transducer.

To produce an average value of the 'noise' energy, integration of the squared AC voltage over a time period is necessary, i.e.

$$E(t)_{Ave} = \frac{K_1}{T} \int_O^T V_i^2 \, dt$$

The processing unit is programmed to carry out the necessary mathematical tasks to give an output proportional to the energy in the AC or 'noise' component of the temperature signal.

The output may be fed to a display device, which may be a digital or analogue meter, or it may be fed to a control system or an alarm system. The alarm system may be set to be turned on when the output reaches a predetermined threshold value, in which case the system may operate as a fire detection system.

The transducer may be any electronic component a property of which varies with temperature. Preferably the property varies linearly (at least over a small temperature range) although this is not necessary as linearisation could be achieved electronically by the processing unit. Suitable components include thermistors, resistance thermometers and semiconductor diodes. Generally the signal from the transducer is a voltage although the current passing through or the resistance of the transducer may also be measured.

The discriminator may comprise an AC amplifier which will only amplify the AC component and will lose the DC component. Alternatively the discriminator may comprise a capacitive coupling arrangement which will separate the AC and DC components so that both of them may be used. The DC component may then be fed to a further processing unit which is programmed to give an output proportional to the ambient temperature of the gas stream.

The processing unit may be an analogue or a digital processor.

One type of analogue processing unit includes a multiplier which has as both its inputs the AC component. The multiplier gives out a signal of the square of the AC component, which is fed to an integrator via a timer-controlled sample and hold circuit. The integrator gives the required output.

Alternatively the analogue processing unit may include a full wave rectifier into which the amplified AC component is fed, and a diode shaping network squarer which produces an output signal which is the square of its input. The output of the squarer is integrated to give the required output.

In a digital system the processing unit comprises an analogue to digital converter and a programmed microprocessor which produces the required output.

In most underground coal mining operations it is necessary to ventilate faces and roadways to prevent the build up of fire-damp and coal dust, which could otherwise build up into explosive pockets, and to keep working conditions bearable for the miners. Ventilation is usually provided by fans in one roadway which cause a flow of turbulent air to pass across the face and through the roadways. This environment is therefore well suited to the use of the present invention.

The invention provides a method of detecting fires in that the output may be used to operate an alarm system when the output exceeds a predetermined threshold value.

A comprehensive system may consist of several sensors at intervals along a roadway, the alarm operating when one sensor only exceeds a norm determined by all the sensors.

This invention is not limited to use in coal mines, and may be used for instance in hotels and office blocks where there is air conditioning.

The invention will now be described, by way of example only, with reference to the accompanying drawings in which;

FIG. 1 shows a block diagram of a α first temperature measurement system according to the present invention, FIG. 2 shows a block diagram of a second temperature measurement system according to the present invention, FIG. 3 shows a block diagram of a third temperature measurement system according to the present invention, and FIGS. 4 to 8 show circuit diagrams for various parts of the systems.

Referring now to FIG. 1, the first system comprises a thermistor 1, an AC amplifier 2, a full wave rectifier 3, a squarer 4, an integrator 5 and a meter 6.

The thermistor 1 is an ITT thermistor type P23 NTC and is connected to the AC amplifier 2 as shown in detail in FIG. 4. The signal, in the form of a voltage, from the sensor 1 is fed via resistor 201 to operational amplifier 202, which amplifies all the signal with a gain of eleven (set by the ratio of resistor 205 to resistor 206). The amplified signal is fed to a highpass filter, comprising capacitor 203 and resistor 211, which only allows the AC component of the signal to pass. The AC component is then fed to operational amplifier 204 which amplifies it with a gain of twenty-one (set by the ratio of resistor 207 to resistor 208). The AC component of the signal has now been amplified with a gain of about two hundred, and the output from the amplifier 2 is fed to the rectifier 3, which is shown in detail in FIG. 5.

The input to the rectifier 3 is fed via resistor 302 to inverting operational amplifier 301. When the signal is positive, the output of the operational amplifier 301 is negative, diode 305 conducts and a negative signal is fed via resistor 307 to the inverting input of second operational amplifier 308, producing a positive output. Operational amplifier 306 is included to ensure that resistor 307 is driven from a voltage source. Conversely, when the input to resistor 302 is negative, the output of operational amplifier 301 is positive, diode 303 conducts and a positive signal is fed via resistor 304 to the non-inverting input of operational amplifier 308. Hence the final output is positive for both input polarities. The rectified output is fed to the squarer which is shown in more detail in FIG. 6.

The single quadrant squarer 4 comprises a network of five diodes 401 to 405 and five resistors 406 to 410. It takes the form of a potential divider formed by two resistors, one fixed (resistor 411) and one variable, the output being defined by the ratio of the two resistors. When the input is less than 0.6 volts, resistor 406 forms the variable resistor. As the voltage rises above 0.6 volts, diode 401 turns on and the variable resistor becomes the parallel combination of resistors 406 and 407. Similarly when the voltage rises above 1.2 v, diode 402 turns on and the variable resistor is then the parallel combination of resistors 406, 407 and 408. Thus the transfer function varies according to the value of the input and by suitable choice of resistors can be made parabolic.

The integrator 5 gives an output to the meter 6 which is proportional to the Energy 'noise' in the air stream.

Referring now to FIG. 2, the second system comprises a fast response thermistor or resistance temperature sensor 7, an AC amplifier 8, an analogue to digital convertor 9 and a microprocessor 10. The microprocessor 10 is part of a control system (not shown) and gives and receives information to and from the data highway 11 which is part of the control system.

The AC amplifier 8 is of the same design as that shown in FIG. 4. The digital converter and microprocessor may be any suitable commercially available equipment.

The sensor 7 gives a voltage output which is dealt with by the AC amplifier 8 in the same way as the output from thermistor 1 is dealt with by AC amplifier 2 above. The signal from the AC amplifier 8 is then passed to the converter 9 which provides the microprocessor 10 with a digital input. The microprocessor 10 is programmed to perform continuously the squaring and averaging operations necessary to produce the desired output, which is then fed into the data highway 11.

Referring now to FIG. 3, the third system comprises a thermistor 31 (again an ITT thermistor type P 23 NTC) which is connected to an AC amplifier 32 of the same type as shown in FIG. 4. The operation of the thermistor 31 and AC amplifier 32 is the same as is described above with reference to FIG. 4. The amplified AC component is fed to both input terminals 4 and 9 on an MC 1495L four quadrant multiplier chip 331, (supplied for instance by Silicon General Inc. 7382, Bolsa Ave., Westminster, Calif.). The output from operational amplifier 332 is proportional to the square of the amplified AC component. The chip 331 and transistor 332 comprise multiplier 33.

Resistor 333 is used to adjust the multiplying constant of the multiplier 331 and the circuitry connected to pins 8 and 12 is used to offset the bias on the input signals fed into terminals 4 and 9.

Figure 8:
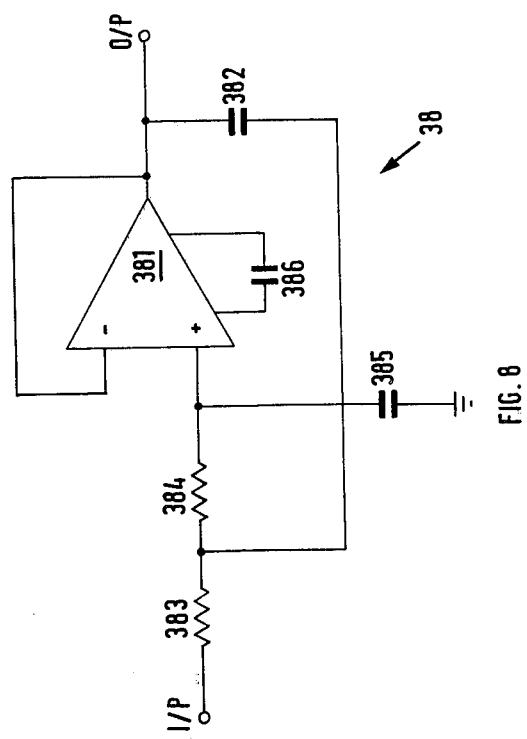

The output from the multiplier 33 is fed to a low pass filter 38 which is shown in more detail in FIG. 8. The filter 34 comprises an operational amplifier 381 and a capacitor 382. This circuit only allows very low frequency or DC signals to pass through. The output of the filter 33 is disconnected by timer 35 and is periodically connected to meter 36, the signal which is then fed to the meter 36 being proportional to the energy "noise" in the air stream.

The values or types of all the components used in the circuits shown in FIGS. 4 to 8 are shown in Table 1.

TABLE 1

| PART | NUMBER | VALUE OR TYPE | PART | NUMBER | VALUE OR TYPE |
|---|---|---|---|---|---|
| Resistor | 201 | 47K | Resistor | 409 | 10K |
| " | 205 | 470K | " | 410 | 3.6K |
| " | 206 | 47K | " | 411 | 10K |

TABLE 1-continued

| PART | NUMBER | VALUE OR TYPE | PART | NUMBER | VALUE OR TYPE |
|---|---|---|---|---|---|
| " | 207 | 47K | Capacitor | 203 | 1μ farad |
| " | 208 | 1M | " | 212 | 150p farad |
| " | 209 | 10K | " | 214 | 1000p farad |
| " | 210 | Variable 500K | " | 348 | 0.1μ farad |
| " | 211 | 1M | " | 351 | 0.1μ farad |
| " | 213 | Variable 100K | " | 382 | 100μ farad |
| " | 302 | 10K | " | 385 | 47μ farad |
| " | 304 | 10K | " | 386 | 150p farad |
| " | 307 | 10K | Diode | 303 | IN 4148 |
| " | 310 | 10K | " | 305 | " |
| " | 311 | 10K | " | 401 | " |
| " | 312 | 10K | " | 402 | " |
| " | 313 | 10K | " | 403 | " |
| " | 333 | Variable 5K | " | 404 | " |
| " | 334 | 12K | " | 405 | " |
| " | 335 | 12K | | 349 | 5.1V |
| " | 336 | 10K | Zener Diodes | 350 | 5.1V |
| " | 337 | 10K | | | |
| " | 338 | 2K | Transistors | 202 | 741N |
| " | 339 | Variable 10K | | 204 | CA 313OS |
| " | 340 | Variable 10K | | 301, 306, 308 | ¼ each of a 348 type transistor |
| " | 341 | 2K | | | |
| " | 342 | Variable 5K | | | |
| " | 343 | 18K | | 332 | 741 |
| " | 344 | 3K | | 381 | CA 313OS |
| " | 345 | 3K | Thermistor | 1 | ITT TYPE P23 NTC |
| " | 346 | 3K | Multiplier | 331 | MC 1495 L. |
| " | 347 | 20K | | | |
| " | 383 | 220K | | | |
| " | 384 | 220K | | | |
| " | 406 | 150K | | | |
| " | 407 | 36K | | | |

In use the thermistor 1 or 31, or the sensor 7 is placed in a turbulent gas stream and by reading the meter 6 or 36 or by interrogating the control system or microprocessor 10 changes in the Energy 'noise' caused by a heat source up stream of the transducer can be detected.

The second system is easily adapted to continuous monitoring for heat sources using several transducers 7, 7A, 7B . . . 7N spaced along a roadway whereas the first system is more suitable for single or intermittent measurements. In the first embodiment the meter 6 may be replaced by an alarm system 6A which will be set off if the heat source produces Energy 'noise' over a preset level.

Thus the present invention provides a temperature measuring system which is flexible and can be used as a fire detection system.

I claim:

1. A fire detection system comprising an electric thermal transducer arranged to be placed in a turbulent gas stream and to produce a first signal having an AC component which is due to temperature variations in the gas stream, the AC component having a variable frequency of up to a few hundred Hz, and having a DC component, which is due to mean temperature of the gas stream, a discriminator which separates the AC component from the DC component, to produce a second signal which is related to dynamic temperature state of the gas stream and a processing unit, to which the AC component from the discriminator is fed and which is programmed to produce an output proportional to a time average of the square of the AC component, the output being related to the temperature of a remote heat source upstream of the transducer, and the output showing an increase with added energy from the heat source or fire upstream of the transducer.

2. A system according to claim 1, and including an amplifier which amplifies the AC component before it is fed to the processing unit.

3. A system according to claim 1 and including an alarm system to which the output is fed.

4. A system according to claim 1, in which the transducer is a thermally responsive resistance element selected from the group consisting of thermistors, resistance thermometers and semiconductor diodes.

5. A system according to claim 1, in which the discriminator comprises an AC amplifier.

6. A system according to claim 1, in which the processing unit includes a multiplier adapted to provide an output which is the square of the output of the discriminator.

7. A system according to claim 6, in which the processing unit also includes an integrator adapted to receive the output of the multiplier.

8. A system according to claim 1, in which the processing unit includes a full wave rectifier and a squarer.

9. A system according to claim 8, in which the processing unit also includes an integrator.

10. A system according to claim 1, in which the processing unit comprises an analogue to digital converter and a programmed microprocessor.

11. An installation for detecting fire according to claim 1 comprising a series of transducers connected to said fire detection system.

* * * * *